US007794825B2

(12) United States Patent
Kudrick

(10) Patent No.: US 7,794,825 B2
(45) Date of Patent: Sep. 14, 2010

(54) PREFABRICATED LIGHTWEIGHT CONCRETE STRUCTURE INCLUDING COLUMNS

(76) Inventor: Jeffrey M Kudrick, 17 Farm Rd., Chester, NJ (US) 07921

( * ) Notice: Subject to any disclaimer, the term of this patent is extended or adjusted under 35 U.S.C. 154(b) by 51 days.

(21) Appl. No.: 11/410,830

(22) Filed: Apr. 25, 2006

(65) Prior Publication Data

US 2007/0248804 A1 Oct. 25, 2007

(51) Int. Cl.
*D04H 1/00* (2006.01)
*B32B 17/12* (2006.01)
*E04B 5/00* (2006.01)

(52) U.S. Cl. .................... 428/292.1; 52/264; 52/309.12; 52/426; 52/481.1; 428/293.4; 428/293.7

(58) Field of Classification Search .............. 428/292.1, 428/71, 293.4, 293.7; 52/405, 309.12, 309.4, 52/309.8, 309.9, 264, 426, 481.1
See application file for complete search history.

(56) References Cited

U.S. PATENT DOCUMENTS

| | | | | |
|---|---|---|---|---|
| 1,936,666 | A | 11/1933 | Hall | 249/48 |
| 3,956,437 | A | 5/1976 | Ellis | 264/40.1 |
| 4,088,808 | A | 5/1978 | Cornwell et al. | 428/409 |
| 4,125,980 | A * | 11/1978 | Miraldi | 52/293.1 |
| 4,229,497 | A * | 10/1980 | Piazza | 428/71 |
| 4,496,511 | A | 1/1985 | Virgili | 264/225 |
| 4,665,673 | A | 5/1987 | Diana | 52/314 |
| 4,887,789 | A | 12/1989 | Harris et al. | 249/16 |
| 5,296,187 | A | 3/1994 | Hackman | 264/257 |
| 5,308,572 | A | 5/1994 | Hackman | 264/510 |
| 5,445,864 | A | 8/1995 | Neu | 428/192 |
| 5,573,348 | A | 11/1996 | Morgan | 405/52 |
| 5,599,599 | A | 2/1997 | Mirmiran et al. | 428/36.3 |
| 5,667,744 | A | 9/1997 | Valle et al. | 264/225 |
| 5,761,861 | A | 6/1998 | Brackett | 52/218 |
| 5,902,528 | A | 5/1999 | Spragg | 264/42 |
| 6,295,782 | B1 | 10/2001 | Fyfe | 52/721.4 |
| 6,355,193 | B1 | 3/2002 | Stott | 264/46.5 |

(Continued)

OTHER PUBLICATIONS http://www.aristonedesigns.com , Aristone Concrete Designs, http://www.arcgfrc.com , Architectural Restoration Castings Co.

*Primary Examiner*—Jennifer C McNeil
*Assistant Examiner*—Camie S Thompson
(74) *Attorney, Agent, or Firm*—Ernest D. Buff & Associates LLC; Ernest D. Buff

(57) ABSTRACT

Prefabricated, lightweight, modular, concrete structures, such as columns and a variety of end caps, have a strong, chip resistant surface exhibiting ornamental designs that include projections and impressions. The high strength of the surface layer is due to reinforcement of the concrete with alkali resistant short length (0.125-0.25 inch) glass fibers that allow replication of fine surface details in the column surface. The surface layer is supported by a second glass fiber reinforced concrete layer that incorporates long length (0.5-1.5 inch) alkali resistant glass fibers. In combination, the first and second layers are about 0.25 to 0.5 inches thick, and the lightweight column is readily handled by forklift trucks or economically transported on flat bed trucks without surface chipping or breakage. The modular concrete structures include concrete columns, end caps and arches, as well as other geometrically decorative assemblies. They fit into each other and are conveniently and efficiently assembled in the field to form column-like structures that embody a wide variety of geometrical shapes.

5 Claims, 2 Drawing Sheets

U.S. PATENT DOCUMENTS

| | | | | |
|---|---|---|---|---|
| 6,763,640 | B2 | 7/2004 | Lane | 52/300 |
| 6,878,323 | B2 | 4/2005 | Fyfe | 264/135 |
| 6,997,427 | B2 | 2/2006 | Manthei | 249/83 |
| 2003/0218265 | A1 | 11/2003 | Garcia-Gutierrez | 264/35 |
| 2006/0032184 | A1 | 2/2006 | Almeter | 52/736.3 |

* cited by examiner

PREFABRICATED LIGHTWEIGHT CONCRETE STRUCTURE INCLUDING COLUMNS

BACKGROUND OF THE INVENTION

1. Field of the Invention

The present invention relates to lightweight monolithic concrete structures such as columns with ornamental surfaces having modular end cap elements; and, more particularly to a prefabricated glass fiber reinforced monolithic modular hollow lightweight columns and end caps that can be easily handled and transported.

2. Description of the Prior Art

Processes for the manufacture of concrete structures such as columns are well known in the art. Several of the column casting processes cast heavy solid concrete columns. Hollow round cross-sectional, cylindrical columns have been produced by a few prior art workers. However, these cylindrical columns are devoid of smooth or ornate surface features. Rectangular columns are also produced by prior art processes; but they are not monolithic, since individual faces must be held together by external means.

U.S. Pat. No. 1,936,666 to Hall discloses a form for concrete columns. These form-cast, solid concrete columns have an elliptical or rounded shape, or a rectangular or square shape. The only feature provided involves adding length extension pieces, which tends to change the lengths of the sides of rectangular columns. Similarly, elliptical forms may be elongated to produce a more oval ellipse. Such forms are said to be easily removed from the columns after curing by knocking out blocks or wedges. These forms do not facilitate casting of hollow, lightweight concrete columns.

U.S. Pat. No. 3,956,437 to Ellis discloses a method and apparatus for casting a concrete column. A reusable concrete column casting mold includes a sheet of flat, flexible material which can be rolled and erected into a columnar configuration into which concrete is cast. This flat sheet is rolled to engage different slots that create a cylindrical mold for casting concrete. The mold is suited for casting cylindrical solid concrete columns and does not facilitate casting hollow rectangular shaped columns.

U.S. Pat. No. 4,088,808 to Cornwell et al. discloses shaped articles of hydraulic cement compositions with a glossy reflective surface, and reinforced with fiberglass. Shaped articles of hydraulic cement compositions that are reinforced with fiber glass fabric or with chopped fiber glass have a smooth, reflective surface. The shaped articles are produced by mixing of "super" water reducers to the aqueous cementitious slurries followed by casting or spraying into synthetic polymer molds, or molds coated with synthetic polymers, or compositions that are water repellent and do not stick to hydraulic cements. The cement slurry contains water reducers and mats of or chopped fibers of fiberglass. The mold non-sticky polymer mold coating produces surfaces of the shaped article that are glossy, reproducing fine details of the polymer coated mold. The shaped article is not a column having a specified shape. The cast cement article is not said to be hollow.

U.S. Pat. No. 4,496,511 to Virgili discloses a method of molding stone faced pillars and the like. The method of molding stone-faced pillars comprises attaching stone pieces onto a wooden base, covering the surface of said base, not covered by the stone pieces, with Plaster-of-Paris, spraying numerous coatings of latex rubber on the entire base and stone pieces of the pillar and spraying numerous coatings of liquid base fiberglass on said coatings, peeling off said coatings, and laying them in right angular relationship in a right angular mold and finally pouring wet cement onto the stone-faced portions to reproduce the stone faced pillar model. The stones are held in place on a wooden form using glue and the space between stones is filled with Plaster of Paris. Rubber is applied in multiple coatings to form a support system that allows individual faces to be peeled from the wooden frame. Four such faces are held together with the stones facing outward, and are clamped to form a mold. A central pipe is inserted and cement is poured to form a column. The space between the stones contains plaster of Paris, which is easily damaged. The latex support needs to be removed and this removal also may damage the Plaster of Paris, adversely affecting the appearance of the column produced. The pipe may not be readily removable, and the column is not hollow. The cement poured is not reinforced.

U.S. Pat. No. 4,665,673 to Diana discloses a monolithic surface ornamentation of pre-cast reinforced concrete wall. A reinforced concrete wall, such as a road barrier or barricade, has a monolithic surface ornamentation thereon constituted by pigmented cements and grooves simulating mortar joints. This decorated concrete barrier is a New Jersey type highway barrier. Different colored cements are sprayed in the designated portions to create a decorated barrier. This structure is a barrier wall and is not a column. The wall has a solid construction comprising reinforcement. It is neither lightweight nor hollow.

U.S. Pat. No. 4,887,789 to Harris et al. discloses a form for molding columns. This form is used for molding building components, such as columns, having a desired size, shape, and surface features produced by solidifying building materials such as concrete. The form is sculpted from a plastic material such as polystyrene or urethane. The plastic cylinder is hollowed so that the interior of the resulting form has the size, shape, and surface features of the desired building component. The form can be cut into at least two connecting parts prior to or after molding. This allows the form to be easily and more quickly removed from a hardened column. The connecting parts are held together during concrete casting by tightenable bands. The cement is poured into the form, producing solid heavy concrete columns. This form does not produce hollow lightweight columns.

U.S. Pat. Nos. 5,296,187 and 5,308,572 to Hackman disclose methods for manufacturing columnar structures and reinforced cementitious structural members. The method for manufacturing circular or rectangular cross-section reinforced cementitious columnar structures includes: providing a mold having a cavity which corresponds to a shape and size of the columnar structure; placing at least one nonwoven metal fiber mat around the periphery of the cavity; filling the cavity with a slurry of cementitious material containing aggregate having a particle size greater than the size of the interstitial voids of the fiber mat; allowing the cementitious slurry to penetrate the reinforcement fiber mat; curing the slurry of cementitious material; and separating the mold from the reinforced cementitious columnar structure. When a cement mixture with aggregates is poured into the mold, the fibrous mat is infiltrated with cement without aggregates due to the filtering action of the fiber mat. The column produced is only reinforced on the surface with fibers. The column produced is solid and not a hollow cylinder and therefore is not light. The surface of the column is the infiltrated mat, which does not have a high quality ornamental surface. The '572 patent the reinforcing fibers are dispersed throughout the cement mixture.

U.S. Pat. No. 5,445,864 to Neu discloses a method of manufacturing glass reinforced concrete substantially hollow building products. The building product produced is an acoustic dispersive barrier, not a column. Even though the barrier is said to be hollow, the figure depicted in the patent shows that the hollow portion is equal to or less than the thickness of GRC of each face that is folded. Therefore, the weight reduction is only minimal. Since the concrete rapid hardening solution is applied before folding the mold, no joining action occurs between the sides. The GRC applied over the channel essentially prevents the separation of the sides, and the two sides of the barrier are not integrally attached. The surface of the barrier is not ornate or smooth, due to the presence of long length glass fibers in the cement.

U.S. Pat. No. 5,573,348 to Morgan discloses structural members. The structural members include solid and hollow core beams, poles, columns and enclosure structures formed of a cement-based low viscosity slurry infiltrated fiber composite material. The form for casting the concrete structure is lined with loose short fibers or fiber mat and cement slurry is poured to produce a fiber reinforced composite material to form solids or articles, or as a facing for existing articles. Since all the sides of the structure are cast together, there is a possibility that cement slurry will drip down, particularly from vertical and overhanging surfaces. Addition of water reducers or superplasticizers is relied upon to set the cement as soon as possible, to create this monolithic solid or hollow structure. These structures are therefore unsuited for load bearing applications such as free-standing columns. Incorporation of random fibers first in the mold followed by infiltration of low viscosity slurry results in fibers sticking through the surface, forming a rough, poor-quality cast concrete surface.

U.S. Pat. No. 5,599,599 to Minniran et al. discloses fiber reinforced plastic ("FRP")-concrete composite structural members. A fiber reinforced polymeric shell forms the mold for pouring in concrete for a column. The shell has protrusions, which enter the main concrete core and anchor the shell to the concrete. The fiber reinforced polymeric shell is never removed and is said to protect concrete from corrosion and damage. The column produced is solid. It is not hollow in construction and is, therefore, heavy. The protrusions into the concrete will weaken the concrete core.

U.S. Pat. No. 5,667,744 to Valle et al. discloses a method for fabricating columns. This method produces solid fiberglass columns, which are polymeric materials with fiberglass reinforcement using a unitary reusable mold. The column thus produced is solid, and is not hollow. This process does not produce hollow glass fiber reinforced concrete columns. The process only produces cylindrical columns, and not rectangular columns, since rotation of the mold is required.

U.S. Pat. No. 5,761,861 to Brackett discloses an apparatus and method for forming a reduced weight masonry column. Modular pieces of stonework are transported to work site and bonded by mortar to a central tube member that forms the cavity. The mortar is only applied to a limited depth. This stonework assembly has the appearance or facade of professionally constructed, custom stonework. The assembly is not a glass filled hollow concrete column. It is merely an assemblage of prefabricated stonework pieces.

U.S. Pat. No. 5,902,528 to Spragg discloses a method of making an article from a lightweight cementitious composition. The cementitious composition comprises Portland cement, perlite, chopped polypropylene fiber and air bubble formers. The composition is cast between an inner mold and outer mold to form decorative lightweight cementitious articles. The inner and outer molds are removed when the cementitious is partially cured. The article is not a column, and constitutes decorative articles molded into one piece. The article does not have decorative fine-finish surfaces. The cementitious article does not have glass fiber reinforcement.

U.S. Pat. Nos. 6,295,782 and 6,878,323 to Fyfe disclose a stay-in-place form. This water-impermeable form is made of a resin impregnated multiple layer fabric and cement mixture is poured into the form. The fibers of the fabric elongate due to the weight of concrete mix poured and shrink back as cured cement shrinks. The resin-coated fabric encloses the concrete structure, preventing concrete corrosion. The concrete column poured is solid and is not hollow. The concrete poured does not have glass fiber cement reinforcement. This is not a lightweight concrete column. The '323 patent discloses anchors and stiffeners that penetrate the concrete core. These penetrations generally weaken the concrete core.

U.S. Pat. No. 6,355,193 to Stott discloses a method for making a faux stone concrete panel. This panel includes one or more thin fiber free concrete layers with macro projections that are created to imitate other natural objects such as s tone, brick and the like. The thin concrete shell may be reinforced with a fibrous polyurethane elastomeric lining and optionally a foam lining. The panel formed is a flat fence barrier and is not a column. It is a solid panel and is not a hollow object. The cement panel does not have alkali resistant glass fibers. The surfaces of the panel does not have reinforcing fibers.

U.S. Pat. No. 6,763,640 to Lane discloses prefab brickwork. These prefabricated, lightweight, columnar or rectangular structures may be converted to fencing or stand-alone columns and resemble solid brick and masonry structures built by skilled masons. Modules comprise heavy-duty durable plastic liners with corner reinforcements comprising heavy-duty square plastic tubing, faced with concrete, mortar and exterior brick and mortar. Modules are erected on concrete footings equipped with raised studs that mate with square plastic tubing and embedded anchor bolts which mate with bottom apertures. Ends of rectangular modules are bolted together and columnar faces. Capitols are of same plastic faced with concrete or mortar and brick veneer. Black plastic tubing simulating wrought iron may be disposed along wall tops. Module inner spaces may be ballast-filled. The column is made from ⅜" plastic with plastic tubing at corners to which brick facing is attached and mortar is applied between the brick facing. This is not a glass fiber reinforced column. Since the plastic interior is flexible and brick facing with mortar attachment is not flexible any application of load to this prefab brickwork delaminates the brick face attachment from the polymeric inner sheet.

U.S. Pat. No. 6,997,427 to Manthei discloses a form for casting concrete block column. This form for casting concrete columns simulates a stack of stone blocks. The form includes first and second side sections, each including two side panels. The side sections are releasably connected together to form a rectangular frame, which has closed and open positions by use of a hinge and may be locked in the closed position. The frame and a base on which the frame rests supports a column side insert. The column side insert has a central opening in which a column is cast. The column side insert imparts a desired appearance to the exterior sides of the cast column. After a column is cast, the side sections are moved to an open position and the column side insert is separated from the column. The form may include inserts for forming passages in the column and for forming one or more notches in the column for receiving fence rails. The block column is cast using a form that has two sections connected by a hinge and a lock on the opposite side. The concrete column is cast as a block and the figure appears to have a hollow central portion. How this central portion is created is not clear. The concrete is poured into the form, not sprayed to form a hollow column.

The hinge is opened only after the block column has cured. Removal of this form will be difficult if the block column external surface has a brick like structure and these features have reentrant surfaces and cannot be easily removed. There is no glass fiber reinforcement in the concrete.

U.S. Patent application publication No. 2003/0218265 to Garcia-Gutierrez et al. discloses a mold and process for casting and manufacturing of concrete structural columns. The mold is for casting and manufacturing of concrete structural columns that includes a main cylindrical body and a plurality of mold components placed inside such main body. The main body is cylindrical and has inside cavity with open ends. The casting elements are four linear half-round section portions with sharp ends, wherein such linear half-round section of each portion is coupled and firmly adhered on the internal wall of the main body, so that the flat side of the four portions remains exposed, in order to give the squareness to the column. The process uses a cylindrical mold with semicircular elements with square faces bonded to the interior of the cylindrical mold to create a square mold with chamfered corners. When cement is poured into the mold to fabricate a concrete column, it produces a solid heavyweight concrete column, not a lightweight hollow concrete column. There is no disclosure that the cement used has glass reinforcement fibers.

U.S. Patent application publication No. 2006/0032184 to Almeter discloses a pre-fabricated outdoor column. The pre-fabricated outdoor column assembly has an outer wall that has the appearance of masonry. The pre-fabricated column assembly includes a tubular member with an insert disposed inside the tubular member. The insert has an opening for receiving a mounting post. It is disposed in a spaced apart relation to the ends of the tubular member such that a first space between the insert and the tubular member and a second space between the insert and the tubular member are formed. The insert further comprises a raceway extending from the first end of the insert to the second end of the insert such that a conduit extending from the first space to the second space is capable of being disposed through the raceway. The outer wall of the tubular member is coated with an elastomeric hard shell coating. The prefabricated column is made from polymeric material such as polystyrene, polyethylene, or polyurethane resins and is adhesively bonded at the corners to create a rectangular hollow column. No disclosure is contained by the '184 patent publication concerning glass fiber filled hollow monolithic cast concrete columns.

Internet publication Aristone Concrete Designs at http://www.aristonedesigns.com/ discloses for sale architectural columns, mantles, balustrade, and others recast in concrete, plaster, and glass fiber reinforced concrete (GFRC). Glass Fiber Reinforced (GFRC) columns are cast horizontally in 2 pieces and can be joined at the factory when a one-piece column is desired. Glass Fiber Reinforced Concrete (GFRC) is a high strength, lightweight concrete product manufactured using sand, cement, alkali resistant fiber and an acrylic polymer curing agent. The final product consists of a GFRC shell approximately ½" to ¾" thick. The finished product is as much as 75% lighter than a comparable concrete product. GFRC is the ideal product for limited access areas where heavy structural columns and or other concrete products are not practical. GFRC is available in 15 colors with a smooth or coral finish. The product is excellent for painting or staining. The GFRC columns shown in the web catalog are all cylindrical not rectangular in shape. The GFRC columns do not have surface texture that is ornamental. It also does not use two-fiber length structure to fabricate the columns.

Internet publication Architectural Restoration Castings Co. at http://www.arcgfrc.com/ teaches that Glass fiber reinforced concrete (GFRC) is a proven engineered composite building material consisting of Portland cement, aggregate, water, glass fiber reinforcement and additives. The glass fibers reinforce the concrete, much as steel reinforcing bars do in conventional construction. The glass fiber reinforcement results in a product with much higher flexural strength than normal concrete, allowing its use in thin-wall casting applications. Because of its low shrinkage rate, GFRC is ideal for replication of historic designs, whether in terra cotta, cast stone, or other materials. By making molds directly from the existing pieces, the exact shape and appearance of the originals can be faithfully replicated. For building panel construction, GFRC castings are manufactured by spraying a series of layers of polymer-concrete material with glass fiber reinforcement in a female mold. A steel frame is bonded to the casting, allowing the panels to be installed by bolting or welding the frame to the building's structural steel. The flex-anchors, which connect the skin to the frame, allow movement of the skin relative to the supporting structure. The sprayed GFRC is supported by a steel shell that is welded. No disclosure is contained therein concerning a freestanding lightweight GFRC column.

Notwithstanding the efforts of prior art workers to construct lightweight cast reinforced concrete structures such as columns, there exists a need for lightweight rectangular or square cross-section columns having high surface finish ornamental surfaces with decorative projections or depressions. Such lightweight columns must exhibit high strength so that they can be easily transported and handled. The lightweight concrete columns must be modular so that top fixtures of different designs may be accommodated easily to produce decorative columns having a unique design.

SUMMARY OF THE INVENTION

The present invention provides a process for making prefabricated, lightweight, modular, concrete, structures such as columns. These lightweight structures including columns and end caps have a very smooth outer surface, which has detailed decorative designs and is resistant to damage by chipping due to the incorporation of short length glass fibers in the face coat that carries the detailed design. This face coat is supported by a second undercoat, which has long length glass fibers embedded in the cement, providing strength to the column. Surprisingly, this glass fiber reinforced concrete (GFRC) column can be handled by machinery, such as forklift trucks and the like, and readily transported without damage or breakage. This advantageous feature is likely due to the reinforcing strength provided by the glass fibers. The integrity of the short and long length glass fibers during concrete cement cure, which forms acicular or needle shaped hydrated calcium aluminate crystals, is maintained by the use of a polymeric coating such as an acrylic polymer that protects the glass fibers. The polymeric layer also provides load coupling between the cement matrix and the glass fiber, thereby strengthening the GFRC column.

Generally stated, the concrete structure or column manufacturing process involves the use of a face pair mold that replicates a pair of adjacent individual faces of a column. The impressions or protrusions in the mold are the reverse of the column face design. The face pair mold is created from scratch using a 'mother' that carries the desired decorative design according to the first embodiment of the invention. The face pair mold may also be created as a polyurethane replica of an existing column, which is cut along the diagonal edge of the column to form two face pair molds, in accordance with the second embodiment of the invention.

The concrete structure or column manufacturing process involves assembly of two face pairs which are hinged, each of the face pairs comprising two adjacent faces with details engraved in reverse of the column face design. The face pairs are opened out first and are sprayed with a first GFRC slurry coating that has the short fibers, hardened to a tacky state and then sprayed with the second GFRC slurry coating containing long length glass fibers. The second layer is allowed to harden to a tacky state after elapse of appropriate time. The hinge is now closed, bringing into contact the two face pairs, and thereby forming a hollow column. The joint line at the hinge and at the location opposite to the hinge in the closed column mold is sprayed with the second GFRC slurry with long length glass fibers to complete the monolithic column formation. Since the second GFRC slurry has long length glass fibers, these fibers bridge the joint line, providing strength to the column thus formed. The monolithic hollow column is provided at one end of the closed column mold with a metallic base frame suited for attachment of the hardened column to a cement footing or bolted arrangement. The opposite end of the closed column mold is shaped in the tacky state to have precise dimensions suited for accepting decorative top castings so that various designs of columns can be assembled at the installation site according to the preferences of the user. The column is allowed to harden completely, and the adjoining tacky joints cure to form a monolithic high strength lightweight glass fiber reinforced hollow concrete structure.

The face pair molds are sprayed in multiple layers with glass fiber reinforced concrete (GFRC) slurry, which produces column surfaces that mimic the precise qualities of real stone. The GFRC slurry contains Portland cement, sand, a polymer glass fiber protecting ingredient and glass fibers.

The concrete structure or column manufacturing process produces a lightweight column that is easy to ship. It uses a time-efficient molding process to produce large numbers of prefabricated columns. Because the columns are substantially hollow, they are lightweight and easy to transport. However, because the columns are composed of a glass fiber reinforced concrete, they are very strong and durable. Further, a metal base frame provides a strong attachment point to attach the columns to concrete footings. The opening of the hollow column opposed to the metallic frame has precise dimensions to accept various designs of ornamental top column structures providing modular assembly of columns with variable design geometry. The finished column includes a prefabricated cap on its top.

BRIEF DESCRIPTION OF THE DRAWING

The invention will be more fully understood and further advantages will become apparent when reference is had to the following detailed description of the preferred embodiments of the invention and the accompanying drawings, in which.

DETAILED DESCRIPTION OF THE INVENTION

Figure 1:
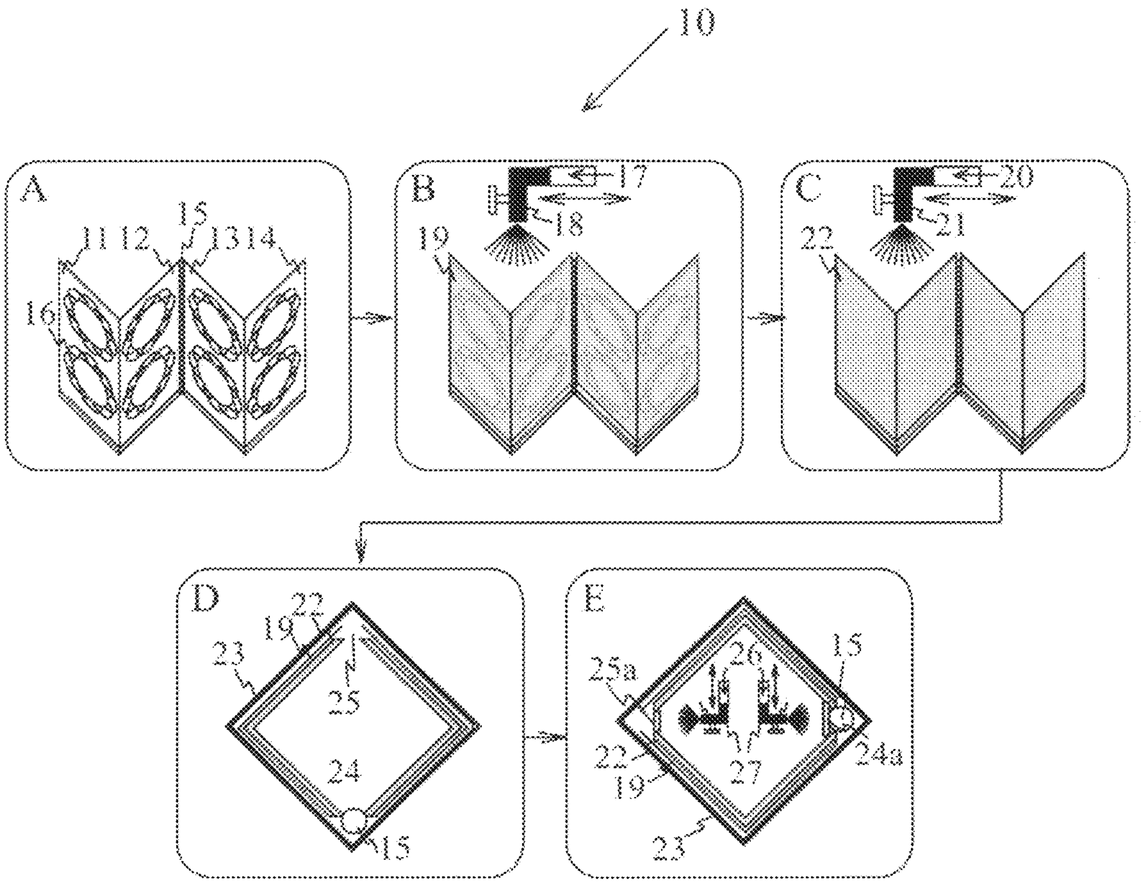
FIG. 1 is a schematic diagram of the steps involved in forming the hollow GFRC column.

The present invention provides highly decorative concrete lightweight modular concrete structures such as columns and end cap structures that have intricate designs on the external surfaces, and which are highly resistant to chipping and breakage. This high strength property and smoothness of finish is obtained in part by a layer of short length glass fiber reinforced concrete (GFRC) forming the outer layer of the concrete. The GFRC outer layer is supported by a second layer of GFRC, which uses long length glass fibers so that the columns have a wall thickness of about 0.25 to 0.5 inches. The two-stage glass reinforcement provides the concrete with strength properties that enable the cured hardened columns to be routinely handled by machinery such as forklift trucks or shipped using standard flat bed trucks without chipping of highly decorative column external surfaces, or breakage.

The process for manufacture of these lightweight, easily transportable decorative GFRC concrete structures, such as columns or end cap structures, is enabled by first creating a pair of face pair molds that carry the impressions or protrusions in reverse and are attached by a hinge. The hinge is opened to expose the face pairs and is sprayed with a slurry of glass fiber reinforced concrete. The first set of layers is sprayed with short length glass fiber reinforced concrete slurry. The first layer is allowed to set to a tacky state and a second layer of long length glass fiber slurry, and allowed to set to a tacky state. Thereafter the hinged face pairs are closed to form a closed column mold and the joints lines at the location of the hinge at the diametrically opposed location of the closed column mold is sprayed with concrete slurry that contains long length glass fibers. The long length glass fibers effectively bridge the joint lines producing a monolithic lightweight glass fiber reinforced cement column. One end of the closed column sprayed glass fiber reinforced column is provided with metallic base fixtures that are permanently incorporated in the concrete and serve as a footing attachment for the column. These metallic footings may be bolted or welded according to the column installer's preference. The opposing end of the column is shaped in the tacky state to provide a precise dimension for mating with column end caps, arches and other modular elements. The surface features present in the face pair mold are reproduced in the glass fiber reinforced concrete due to the use of short length glass fibers, which provide strengthening and chipping resistance to the surface features of the lightweight column.

The ornamental end caps as well as arches and other forms of end caps are fabricated in a manner similar to the fabrication of the column. Here again, a hinged face pair mold is created, sprayed with a first layer of short glass fiber reinforced concrete slurry, followed by a second layer of long length glass fiber reinforced concrete slurry. The mold is closed and sprayed with long length glass fiber reinforced concrete slurry to produce an ornamental end cap, arch or other modular element. The outer edges at the ends of the fabricated end caps are shaped in the tacky state to provide an end cap that fits into the ends of corresponding modular column. During assembly, a variety of adhesives may be used to permanently attach end caps to columns. The end caps do not require this adhesive joining feature since they fit snugly into corresponding column ends, providing a removable joint.

The face pair molds are sprayed with a release agent so that the hardened concrete may be removed without destroying the mold. The release agent may be silicone based or a polymeric coating. The face pair molds are next sprayed with a first layer of short length glass fiber reinforced concrete (GFRC) slurry, which may comprise one or more spray applications. The GFRC slurry typically contains short length (typically 0.125 inch to 0.25 inch length) glass fibers. The thickness of the first coat is typically in the 0.0625 to 0.125 inch range. The presence of short length glass fibers imparts strength to the first layer, providing chipping resistance and overall strength. Due to the small length of the glass fibers, the GFRC produces a very fine surface finish that replicates every intricate design details present in the face pair of the mold. The first coat is allowed to become tacky, which may take few hours, representing the onset of the setting of the Portland cement in the GFRC slurry. At the same time, the glass fibers receive a coating of the polymeric glass fiber protecting ingredient.

The face pair molds having the first sprayed coating are then sprayed with a second coating of one or more applications of GFRC slurry with long length (typically 0.5 inch to 1.5 inch length) glass fibers. Due to the long length of glass fibers, the second GFRC layer provides support to the first sprayed layer and imparts strength to the reinforced hollow column produced. The second sprayed coating of GFRC with long length fiber is allowed to harden to a tacky state, which takes few hours. During this time period, the Portland cement undergoes initial stages of setting and the polymeric glass protecting ingredient coats the glass fibers, protecting them from damage due to the formation of calcium aluminate needle shaped cement crystals. The overall thickness of the first and second GFRC layers is typically 0.25" to 0.5".

Now the hinge of the mold is closed when the second GFRC layer is still tacky, bringing together the face pairs forming a closed cylindrical column mold that has joint lines at the hinge portion and at a location diametrically opposed to the hinge. The opposing surfaces of the mold can join together at this stage, since the GFRC is still tacky. Unfortunately, there are no glass fibers crossing this joint line. Consequently, this joint line may not be mechanically strong. To combat this strength problem, a GFRC with long length reinforcing glass fibers is sprayed along the entire length of the joint lines. The long length glass fibers in the sprayed region extend across the joint line, providing mechanical strength to the monolithic lightweight concrete columns. Preferably, the closed mold may be rotated by 90 degrees about the axis of the concrete column prior to spraying, so that the joint lines are in a horizontal plane and the sprayed second slurry of GFRC does not drip down due to gravitational forces.

The GFRC slurry typically has a composition of 40 to 45 wt % cement, 40 to 45 wt % sand, 0.3 to 0.5 wt % superplasticizer, 3-5 wt % alkali resistant glass fiber, 14-16 wt % water and 3-5 wt % acrylic polymer. The preferred range of the glass fiber reinforced concrete slurry is 42 wt % cement, 42 wt % sand, 0.4 wt % superplasticizer, 3-5 wt % alkali resistant glass fiber, 14-16 wt % water and 3-5 wt % acrylic polymer. The cement used is Portland cement or white cement or hydraulic cement. The superplasticizer removes water easily and makes the coating tacky in a short period of time, typically 1-2 hours. The Cem-Fil® fibers are alkali resistant glass fibers and withstand corrosion of alkaline cement mixture. Such fibers are available from Saint-Gobain under the trade name Cem-Fil®. An acrylic polymer such as Forton VF-774 coats the surfaces of the glass fibers and prevents the hydrated calcium aluminate acicular needles in the cured cement from damaging the glass fibers. The superplasticizer typically is selected from the group of polymers consisting of the alkali metal salts of melamine sulfonic acid partially condensed with formaldehyde, the alkali metal salt of naphthalene-sulfonic acid partially condensed with formaldehyde. The first sprayed GFRC contains Cem-Fil® reinforcing glass fibers with a typical length of 0.125 inch to 0.25 inches. The second sprayed GFRC contains Cem-Fil® reinforcing glass fibers with a typical length of 0.5 inch to 1.5 inches.

The mold for the face pairs may be made by several methods. The design for the column may be first created in wood, Plaster of Paris or any other suitable working media. Creation of this original master design is time consuming and labor intensive. It is more like the creation of an artwork. This is the original master for the design that becomes the column face. This design needs to be replicated in a reusable mold. In the first embodiment of the invention, the master is coated with a release material so that the mold may be easily removed from the master. The release layer is coated with urethane rubber. A fiberglass mat is placed on the urethane rubber and wood ribs are set in the resin to provide mechanical rigidity to the mold. The urethane resin is allowed to cure and the mold is removed from the master. This mold is called the 'mother'. Two such molds are joined together to form a face pair. Two face pair molds are hinged together to create a mold adopted for GFRC slurry spraying.

In the second embodiment of the invention, the face pair mold is created from an existing previously made column. The column external surface is sprayed with a release layer. The column is surrounded by a two or four part wooden enclosure that is coated with a release layer. The space between the wooden enclosure and the column is filled with urethane rubber and allowed to cure. The wooden enclosure is removed and the cured urethane mold is cut along two opposing edges to create two face pairs. Since the urethane rubber mold thus created is generally thick it does not require reinforcement of a fiberglass mat such as that used in the first embodiment wherein the urethane rubber layer is generally thin. Two face pair molds are hinged together to create a mold adopted for GFRC slurry spraying.

FIG. 1 illustrates generally at 10 the steps involved in forming the hollow GFRC column. In the first block, marked A, two face pairs hinged at one corner 15 and each of the faces 11, 12 13 and 14 contain ornate designs 16 that are in reverse and will be replicated when the GFRC mixture is sprayed. The individual mold faces are typically made from urethane rubber, either as a original design according to the first embodiment, or as a replication of a previously made column according to the second embodiment. In the block marked B, the hinge 15 is opened fully, exposing the two face pairs for spray with the first GFRC mixture 17 from a sprayer 18 that contains short length alkali resistant glass fibers. Typical thickness of this first coating is 0.062 inches to 0.125 inches. Due to the short length of the glass fibers, the first GFRC coat 19, shown partially transparent, replicates every feature of the ornamentation in the mold and produces a smooth, even surface. The first GFRC coat 19 is allowed to harden to a tacky state, which typically takes 1 to 1.5 hours. In the block marked C, a second GFRC mixture 20 is sprayed from a spray gun 21 on the two face pairs, providing a second GFRC coating 22 with long length glass fibers over the first GFRC coating 19. The second GFRC coat 21 is allowed to harden to a tacky state, which typically takes 1 to 1.5 hours. In the block marked D, the hinge 15 connecting two face pairs is closed, forming the hollow column. Hinge 15 is held in place by a plurality of bands 23. A joint line is present at the hinge location 24 and at 25, opposed to the hinge. In the block E, the preferred mode of column production, the column is turned by 90 degrees about the column axis to bring the joint line 24 and 25 into the horizontal plane. The GFRC of the second composition 26 is sprayed along the joint line from a spray gun 27 to encase the joint lines 24 and 25 forming GFRC closures 24*a* and 25*a* respectively. A metallic hardware component (not shown) is embedded in one end of the column for column support.

Figure 2:
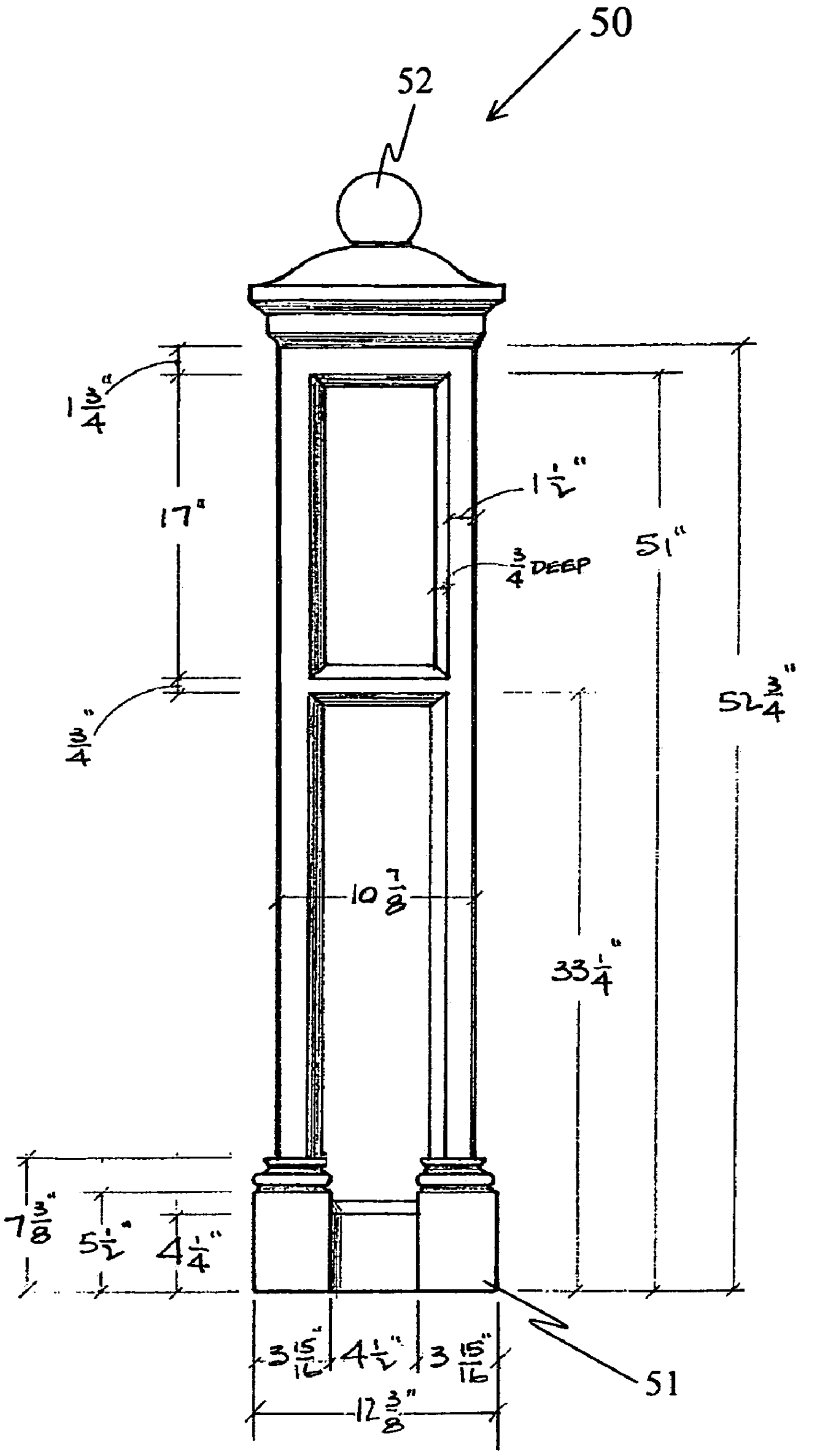
FIG. 2 shows a typical column produced by the process with a metal base and prefabricated end caps.

FIG. 2 shows at 50 a typical column produced by the process with metal base 51 and prefabricated end caps 52. Typical dimensions of a GFRC column are also indicated.

The key components of the process for making prefabricated lightweight concrete structures, such as columns, comprise the steps set forth below:

1) Preparing a face mold comprising the steps of:
  - a) sealing and spraying with release material a pair of column faces adjoined as a face pair, and having the shape of the column profile in reverse;
  - b) spreading urethane rubber over the column face pair;
  - c) applying a layer of fiberglass mat over the rubber, so that the mat takes the form of the rubber, said mat being referred to as a "mother" and having wood ribs set in the resin to keep it rigid and maintain the shape of the entire panel;

d) allowing the rubber to cure;

2) clamping two hinged face pairs in place to create a mold, the mold being hinged in two halves of the face pairs;

3) spraying a first face coat of glass fiber reinforced concrete (GFRC) material comprising short length glass fibers into the two face pair halves of the open mold and allowing the sprayed layer to become tacky;

4) spraying a second strengthening coat of glass fiber reinforced concrete (GFRC) material comprising long length glass fibers into the two halves of the open mold over the face coat and allowing the sprayed layer to become tacky;

5) closing the hinged two halves to form the column;

6) spraying the joint lines at the hinge and at a location opposed to the hinge with said second coat of GFRC;

7) embedding a metal frame at the base of the mold, wherein the GFRC material is pressed over rebar anchors that are welded to the metal base frame;

8) shaping the interior of the column opposed to the metal frame end to precise dimensions that enable connections to other modular units such as end caps;

9) allowing the monolithic GFRC column structure to cure;

10) drilling holes in the metal base frame to allow attachment points to anchor the column to a concrete footing;

11) opening the mold and removing the column; and 12) installing a prefabricated cap at the top of the column.

While the first embodiment is used to create the original design of concrete structures such as a column, step (1) is generally slow and intricate since the required design must be produced in the mother. Once a column is created, it can be easily reproduced using the second embodiment of the process. In the second embodiment of the process, a release layer coated wooden frame is encircled around an existing column and urethane rubber is poured into the space between the wooden frame and the column external surface to create a mold for casting additional columns. The rubber mold is cut along two opposing diagonal corners to create two face pairs of the casting mold. The rubber mold may be coated with a release layer for easy removal from the concrete. Steps (2) through (12) are then repeated to create a column.

The column manufacturing process detailed above refers to producing lightweight concrete columns with very smooth surface finish and attractive design. The end caps or other modular elements, such as arches and the like, are produced exactly in the same manner using a pair of hinged face pairs.

The column manufacturing process is especially useful for producing columns for "do-it-yourselfers", since they are completely prefabricated, easy to install and, owing to the reinforced concrete structure, enjoy long service life. The user purchases the lightweight column, installs the preferred cap and sets or bolts the metallic bottom hardware in cement to produce a decorative column of any desirable configuration. The columns that are produced by the column manufacturing process are very attractive and provide a lasting accent to any home and/or yard.

Having thus described the invention in rather full detail, it will be understood that such detail need not be strictly adhered to, but that additional changes and modifications may suggest themselves to one skilled in the art, all falling within the scope of the invention as defined by the subjoined claims

What is claimed is:

1. A lightweight, prefabricated modular concrete structure having a hollow configuration in the shape of a column; said concrete structure comprising a first exterior layer consisting of short length glass fiber reinforced concrete forming a smooth outer surface supported by a second interior layer consisting of long length glass fiber reinforced concrete; wherein said first layer of short length glass fibers produces a fine surface finish and replicates intricate design features on the external surface of said concrete structure; and wherein said column further comprises prefabricated end caps.

2. The concrete structure of claim 1 wherein said first exterior layer of short length glass reinforcing fibers comprises alkali resistant glass fibers having a length ranging from 0.125 to 0.25 inches.

3. The concrete structure of claim 1 wherein said second interior layer of long length glass reinforcing fibers comprises alkali resistant glass fibers having a length ranging from 0.5 to 1.5 inches.

4. The concrete structure of claim 1 wherein said first exterior layer has a thickness ranging from 0.062 to 0.125 inches.

5. The concrete structure of claim 1 wherein said first exterior layer and second interior layer have a combined thickness ranging from 0.25 to 0.5 inches.

* * * * *